United States Patent [19]
Milligan

[11] 3,753,067
[45] Aug. 14, 1973

[54] MOTOR SPEED REGULATION SYSTEM

[75] Inventor: Lee J. Milligan, Fairfield, N.J.

[73] Assignee: Peripheral Systems Corp., Fairfield, N.J.

[22] Filed: May 17, 1972

[21] Appl. No.: 254,242

[52] U.S. Cl.................. 318/314, 318/318, 318/341
[51] Int. Cl............................................. H02p 5/16
[58] Field of Search................... 318/271, 314, 318, 318/326, 327, 341, 396, 397, 398, 411; 307/2, 72

[56] References Cited
UNITED STATES PATENTS

| | | |
|---|---|---|
| 3,295,039 | 12/1966 | MacDonald .......................... 318/318 |
| 3,646,417 | 2/1972 | Cassie ................................ 318/318 |
| 3,093,783 | 6/1963 | Hass..................................... 307/2 |
| 3,309,597 | 3/1967 | Gabor................................ 318/396 |

Primary Examiner—Bernard A. Gilheany
Assistant Examiner—Thomas Langer
Attorney—George E. Kersey

[57] ABSTRACT

A motor speed regulation system employing integrated and discrete semiconductor components, in which either a direct drive signal or a digitally incremented biasing signal is applied to the motor to bring it up to speed or to maintain it at a desired speed under load.

12 Claims, 6 Drawing Figures

FIG. 4B  BRUSHLESS MOTOR COMMUTATOR CIRCUITRY

MOTOR SPEED REGULATION SYSTEM

BACKGROUND OF THE INVENTION

This invention relates to the regulation of electrical motor speed and, more particularly, to the efficient and compact regulation of electrical motors operating under various load conditions.

The precision regulation of electrical motor speed is required in numerous commercial and non-commercial contexts, many of which also require equipment that is as efficient and compact as possible. For example, in the case of a movie camera, a speed regulation of greater than five parts in a million is required in order to produce films of suitable commercial quality. In addition, portability is essential if the camera is to have the desired degree of versatility. It is evident that portability achieved by using weighty batteries, or batteries which are drained of charge after only short time because of power requirements, is of dubious value.

In any event, even where compactness is of secondary importance, precise speed regulation with a high degree of operating efficiency is always of prime concern, as, for example, in the speed regulation of large electrical motors.

Similar considerations exist for such other operations as the control of machine tools, the use of constant flow ventilating equipment, the use of fluid transport apparatus, the use of tape transports for data processing, and the like.

Attempts have been made to achieve suitable speed regulation by the use of synchronous and hysteresis alternating current motors. These motors have the objection of being operable at only the power line frequency. They are large, expensive and inefficient. They also are unable to recover synchronism once they have become overloaded.

Another approach to motor regulation has been to use the comparison between a reference signal (representative of desired motor operation) and an indicator signal (representative of actual motor operation) to produce a control signal. The latter is typically an analogue or digital output for controlling the full amplitude of the motor excitation. The analogue control signal has the objection that minor errors in amplitude can produce disproportionate errors in control. Consequently, analogue control signals tend to produce an over correction which produces objectionable hunting and can cause significant power drain. The digital control signals perform a switching function with respect to the motor excitation that is accompanied by objectionable jitter as the control pulses repeatedly go from "on" to "off." In addition, the switching produces undesirable transients in the motor windings, which have an adverse effect on the control circuitry.

Accordingly, it is an object of the invention to achieve precision speed regulation of electrical motors, particularly where compactness and low power drain are required. A related object is to limit the need for high power sources to achieve a desired degree of speed regulation.

A further object of the invention is to achieve highly efficient and reliable speed regulation of electrical motors. A related object is to provide a highly reliable motor indicator signal in which the effects of jitter are significantly curtailed. Another related object is to produce a stable and highly accurate reference signal for use in regulating electrical motors, regardless of their desired operating speed.

Still further objects of the invention are to prevent instability and subharmonic operation in an indicator and reference signal comparator used in producing a control signal for the precision speed regulation of electrical motors.

SUMMARY OF THE INVENTION

In accomplishing the foregoing and related objects, the invention provides for monitoring an operating condition of an electrical motor and applying either a direct motor drive signal or a pulsating increment to a motor bias signal, according to whether the motor is operating below or at its desired speed under load.

By providing a direct drive signal when the motor is running below speed, maximum torque is applied to restore the motor to its proper speed in the shortest possible time. By applying an incremental pulse signal to the motor bias signal when the motor is operating at proper speed, but with an increasing load, only a small amount of power is switched to maintain the proper motor speed, and the power handling requirement of the switch is reduced accordingly. The bias signal is applied continuously at a level just below the back electromotive force of the motor. Not only does the bias signal permit the incremental switching of the motor drive signal, it prevents the undesirable transients that would otherwise be generated by the motor windings as a result of the switching. The use of the motor bias signal also permits incremental switching, in accordance with the invention, to be used with any type of motor, including permanent magnet D.C. motors that would be demagnetized by the use of full amplitude switching.

In accordance with one aspect of the invention, an accurate indication of actual motor speed and operation is obtained using a motor mounted tachometer for which the frequency of the output signal is deliberately made very much higher than the desired motor speed and is divided to a desired frequency level in order to eliminate the effects of motor and tachometer jitter.

In accordance with another aspect of the invention, an accurate reference signal is produced by a stable, crystal controlled oscillator operating at a frequency many times in excess of the desired motor speed. The oscillator output is also reduced to an appropriate frequency level by a divider.

In accordance with a further aspect of the invention, the accuracy of the reference and indicator signals is enhanced by the selective use of low-noise, complementary symmetry metal-oxide-semiconductor circuit components, and miniaturization is facilitated at low cost by the selective use of transistor-transistor-logic circuit components.

In accordance with still another aspect of the invention, the reference oscillator is formed using a stable, high-frequency crystal which can be accompanied by a variable capacitor to vary the reference frequency as desired.

In accordance with other aspects of the invention, the duty cycle of the motor indicator signal is reduced to less than fifty percent to prevent instability in the comparator used for the reference and indicator signals, when the loading of the motor produces a phase lag between the signals approaching one hundred and eighty degrees.

DESCRIPTION OF THE DRAWINGS

Further aspects of the invention will become apparent after considering several illustrative embodiments, taken in conjunction with the drawings in which.

DETAILED DESCRIPTION

Figure 1:
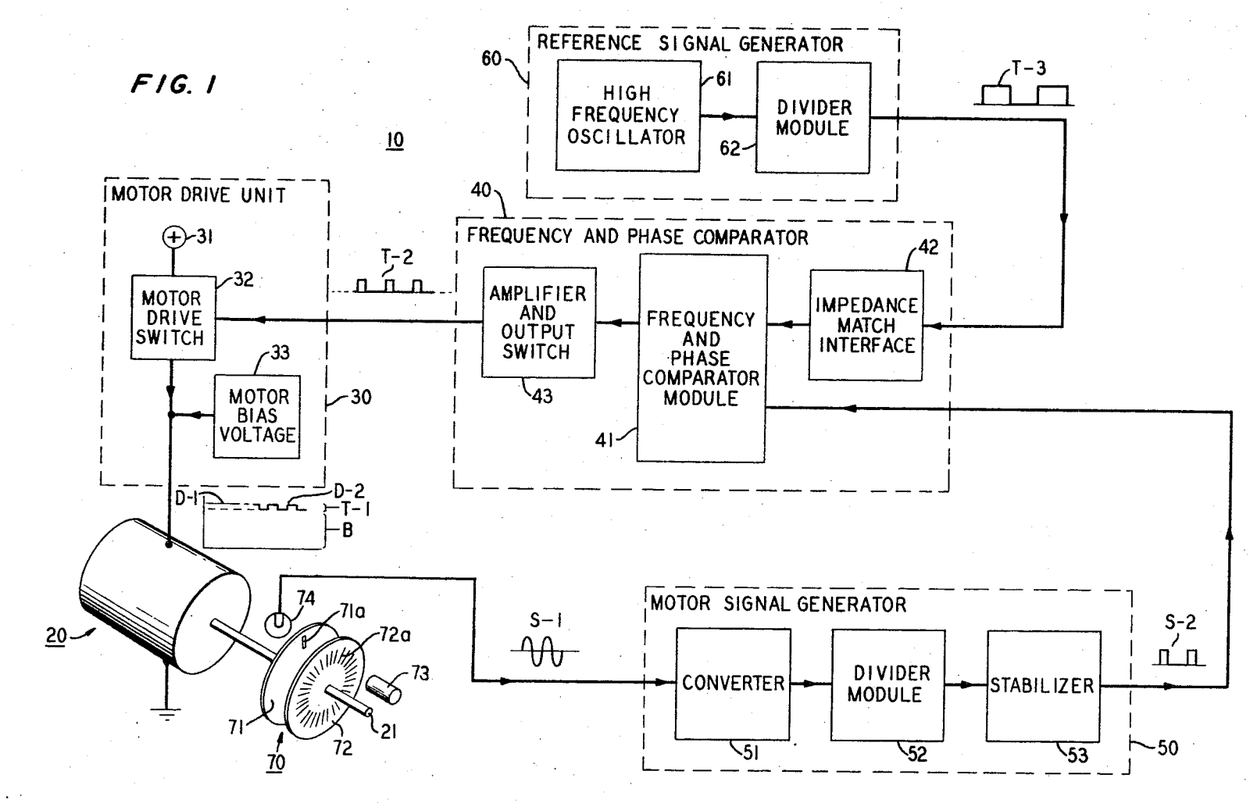
FIG. 1 is a block diagram of a speed regulation system in accordance with the invention.

Turning to the drawings, the motor speed regulation system 10 of FIG. 1 for a motor 20 includes a motor drive unit 30 for applying a direct drive signal D-1 to the motor 20 until it reaches a prescribed speed, and thereafter applying a pulsating drive signal D-2, formed by incrementing a motor bias voltage B with a pulse train T-1. The motor 20 may take any of a wide variety of forms, illustratively either a brush or a brushless D.C. motor.

The direct drive signal D-1 has the magnitude of a voltage source 31 within the drive unit 30, and obtains when a motor drive switch 32 is closed under the control of a frequency and phase comparator 40. The switch 32 remains closed, and the maximum motor drive signal is applied, as long as the inputs to the comparator 40 indicate that the motor 20 is running below the desired operating speed.

When the motor 20 reaches the desired speed, the comparator output becomes a train of pulses T-2. Each pulse has a width determined by the extent to which the phase of a motor signal (produced by a motor signal generator 50) lags behind a reference signal (produced by a reference signal generator 60). The phase lag is, in turn, dependent upon the loading of the motor 20. The greater the loading, the greater is the pulse width.

The pulse signal output T-2 of the comparator 40 operates the switch 32 to provide counterpart pulses T-1 which increment the bias level B. The greater the pulse width, the greater is the corresponding incremental pulse energy supplied to the motor. Even at no load there will be a train of narrow pulses energizing the motor 20 to keep it operating at the desired speed in the face of small losses due to friction, windage and the like. As for the bias level B, it is produced by a motor bias voltage source 33 and is of magnitude just below the back electromotive force (emf) of the motor 20. The setting of the bias source 33 depends upon the desired speed of the motor since the back emf also depends on motor speed.

Because the invention employs incremental pulses T-1 in combination with a bias signal B to energize the motor 20, the switching of the additional signal needed to keep the motor operating at its proper speed is not subject to the appreciable power handling requirement that would otherwise apply. Thus, instead of switching between zero and a peak level, the use of a bias voltage B to energize the motor at a level below the back emf permits the switching to take place over a narrow range of, for example, 20 and 21 volts for one kind of motor. This permits circuit simplification and economy of power. Other advantages are that the switching will not produce objectionable transients in the motor windings and the switching control can be used with any kind of motor, including permanent magnet D. C. motors that would be demagnetized and rendered inoperable by a pure switching operation.

The motor signal that furnishes an indication of the motor operating condition is produced by a tachometer 70, which is formed by two disks 71 and 72. The first disk 71 is stationary and has a single aperture 71a near its periphery, while the second disk 72 is mounted on the shaft 21 of the motor 20 and has a circumferential set of closely spaced, printed line segments 72a. Light from a source 73 shines through the aperture 71a in the first disk 71 and is intercepted by the rotating line pattern 72a of the second disk 72, eventially falling upon a photo transducer 74 which produces a sinusoidal wave S-1 with a frequency that depends on the rate of rotation of the shaft 21 and the spacing of the line segments 72a. By including a large number of line segments 72a on the rotating disk 72, the result is a tachometer wave S-1 which has a very much higher frequency than the rotational speed of the motor 20. This permits compensation for the inevitable motor and tachometer jitter in a motor signal generator 50.

After appropriate shaping into a square wave by a converter 51 in the motor signal generator 50, jitter in the tachometer wave is significantly reduced by a divider module 52. The output from the divider module is applied to a stabilizer 53, to prevent instability in the phase comparator unit 40. It does this by decreasing the duty cycle of the pulse signal output of the divider. As a result, the motor generator signal S-2 applied to one input terminal of the comparator 40 will not have edges that coincide with opposite going edges of the output T-3 from the reference signal generator, applied to another input terminal of the comparator 40, when the frequencies of the signals are the same and shifted by 180 degrees.

The reference signal T-3 of the generator 60 has its origin in a crystal-controlled, high frequency oscillator 61. Such an oscillator is extremely stable and accurate. In order to bring the output of the oscillator 61 within the frequency range of the motor signal S-2, a divider module 62 is employed.

The core constituent of the phase comparator is a frequency-phase detector module 41, detailed below. An impedance matching interface 42 matches the detector module 41 with the divider module 62 when the two modules are organized with different logic structures. The output of the detector module 41 is applied to the motor drive unit 30 through an amplifier and output switch 43.

When the frequency of the motor signal S-2 is below that of the reference signal T-3, there is a continuous output from the comparator 40 which maintains the switch 32 in its closed condition to allow full application of the motor drive voltage D-1 to the motor 20. This increases the torque applied to the motor. When the motor speed reaches the desired level, the output of the comparator 40 becomes the pulse train T-2. For every trailing edge of the reference signal T-3 that leads the motor signal S-2, the comparator is "on" until the trailing edge of the motor signal S-3 turns the comparator "off." The result is the pulse train T-2 which, in turn, results in the incremental pulse train T-1. When the motor signal S-2 has a frequency in excess of the reference signal T-3, there is no comparator output at all.

In an illustrative embodiment of the invention, the reference oscillator 61 employed a crystal with a frequency of 400 kilohertz and the divider module produced a division of 1,025 ($2^{10}$) so that the reference signal T-3, when the motor was operating at its correct speed, became 390.625 hertz.

Correspondingly, the tachometer 70 employed a disk with 5000 line segments producing a sinusoidal tachometer output S-1 with a frequency of 200 kilohertz. The divider module 52 then produced a division of 512 ($2^9$) so that the motor signal was also 390.625 hertz.

Figure 2A:
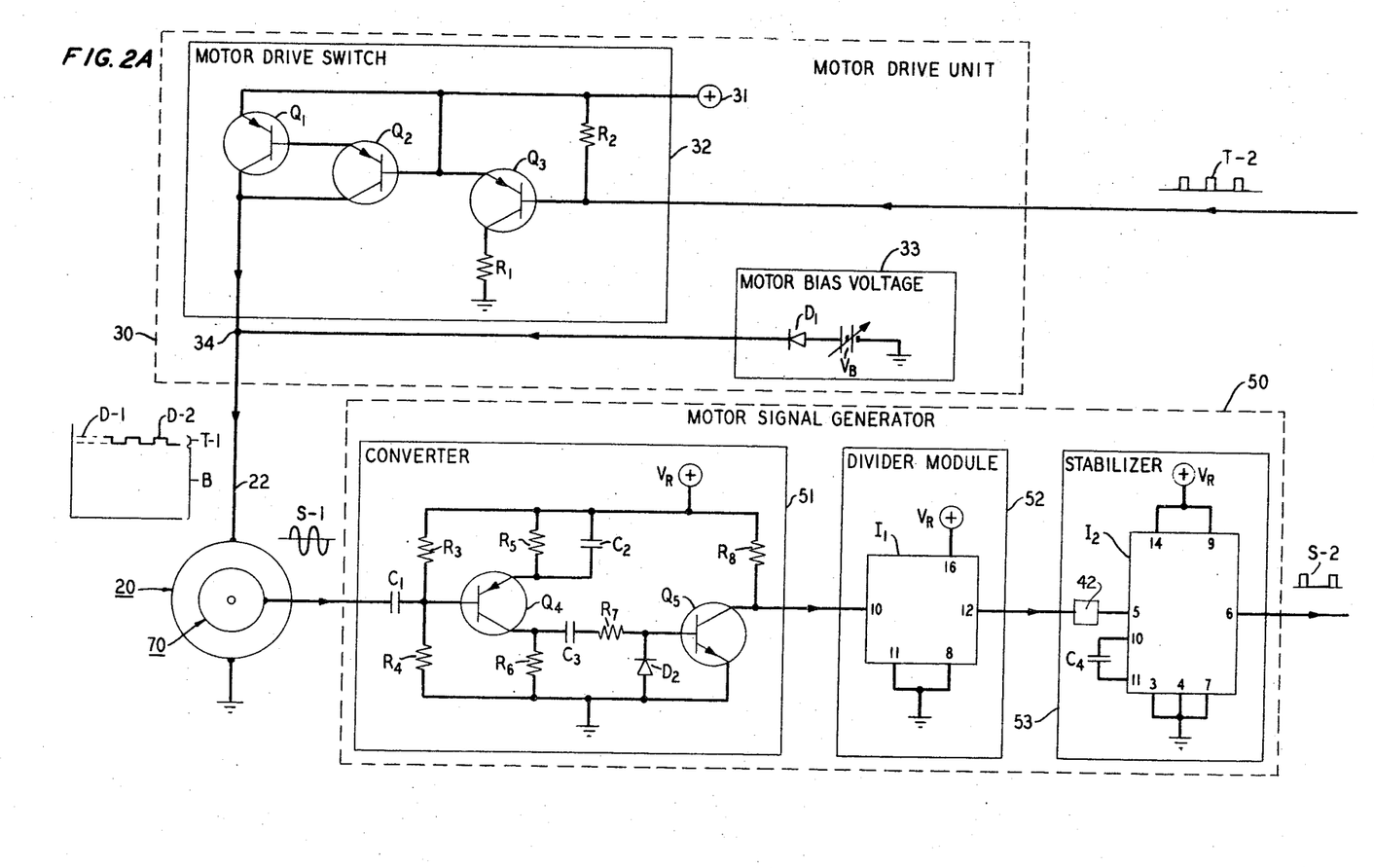
FIGS. 2A and 2B are circuit diagrams illustrating the various constituents employed in the block diagram of FIG. 1.
Figure 2B:
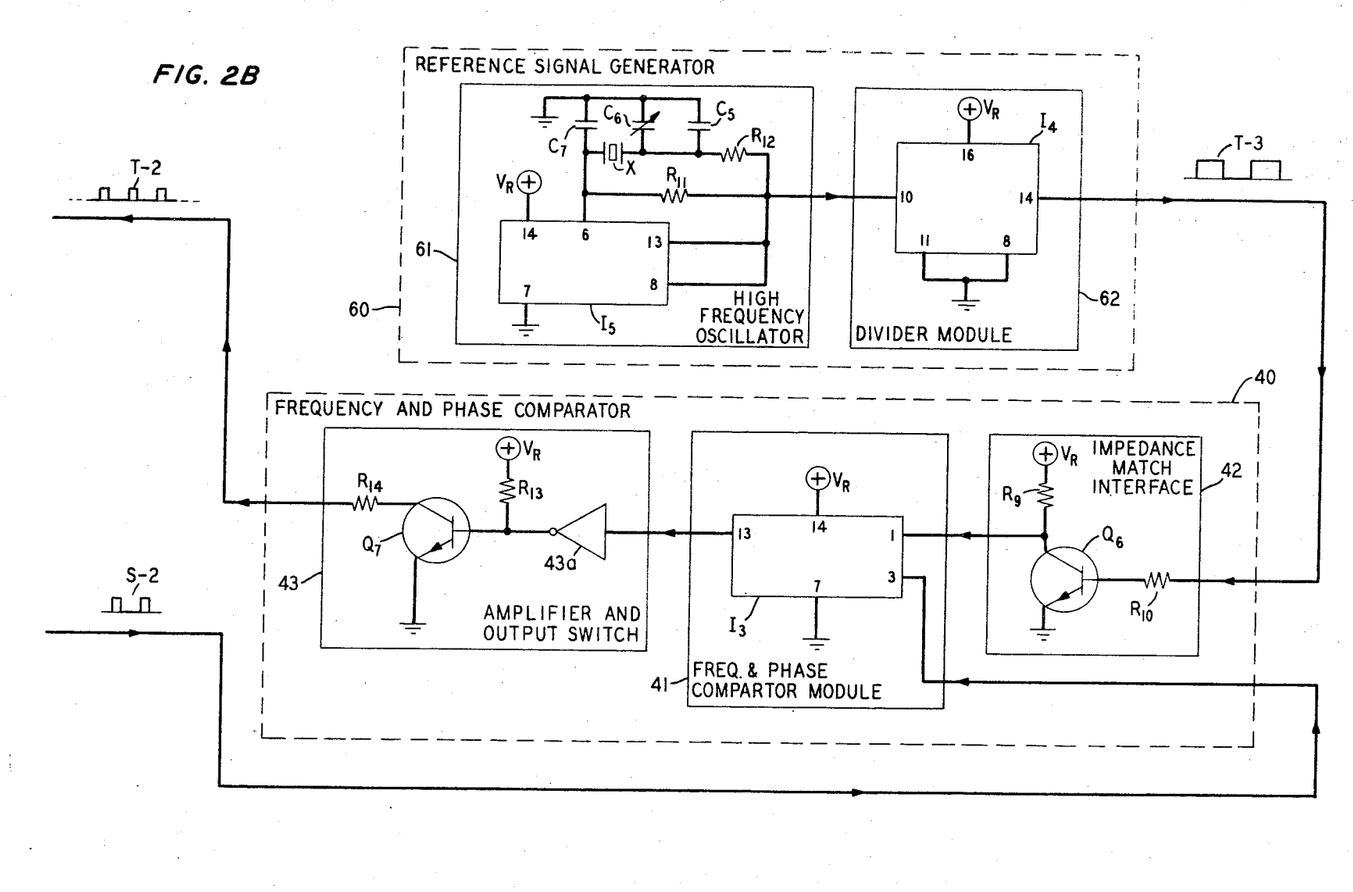

Details of representative constituents for the motor speed regulation system of FIG. 1 are shown in FIGS. 2A and 2B. As indicated by FIG. 2A, the motor drive unit 30 desirably employs a high gain, above-ground switch formed by two transistors $Q_1$ and $Q_2$ connected as a Darlington pair. The latter are in turn operated by transistor $Q_3$ with its collector connected to ground by a resistor $R_1$ and its base connected to a source 31 of the direct drive signal D-1 through a resistor $R_2$. The bias voltage portion B of the direct drive signal D-1 is provided by an adjustable bias source $V_B$ in the motor bias unit 33.

Both the direct drive voltage D-1 and the motor bias voltage B are applied to an excitation terminal 22 of the motor 20 at a junction point 34. Since the voltage D-1 of the source 31 exceeds the voltage B of the bias source $V_B$, the motor bias unit 33 includes an isolating diode $D_1$. As a result, the bias source $V_B$ continually energizes the motor 22 at a voltage level B which is slightly below the back emf of the motor 20. Consequently, when the motor is operating at the desired speed and is thereafter subjected to additional loading, the further excitation needed to supply the power requirements of the increased load, without causing a loss of speed, is achieved by switching the Darlington transistors $Q_1$ and $Q_2$ to provide a pulse-controlled low-resistance path from the source 31 to the junction point 34, giving rise to the pulsating incremental signal T-1 and forming the pulsating motor drive signal D-2.

The operating condition of the motor 20 is indicated by the tachometer 70 and a corresponding motor signal is produced by the signal generator 50. In the latter, the high frequency sinusoidal output S-1 of the tachometer is amplified in the converter 51 by a transistor $Q_4$ operating with its associated capacitors and resistors $C_1$, $C_2$ and $R_3$ through $R_6$. The amplified wave is then converted to a square wave by the combination of a diode $D_2$ and a transistor $Q_5$, with associated capacitive and resistive components $C_3$, $R_7$ and $R_8$. Voltage is supplied to the converter transistors $Q_4$ and $Q_5$ by a regulated power supply $V_R$ of standard construction.

Since the tachometer frequency is deliberately made much higher than the motor speed to permit compensation for jitter, limited only by the extent to which a large number of discrete line segments can be printed on the rotating disk portion of the tachometer 70, the output of the converter 51 is applied to a divider module 52. The divider module 52 is illustratively constituted by a monolithic silicon, digital integrated circuit $I_1$ of the complementary symmetry metal-oxide-semiconductor variety. The representative integrated circuit $I_1$ bears the designation "CD4020E" of the RCA Solid State Division, Somerville, New Jersey, and is described in RCA publication "Digital Integrated Circuits" Monolithic Silicon CD4000E Series, File No. 445, printed Aug. 1970.

Such an integrated circuit is known as a 14-stage ripple-carry binary counter/divider and is contained in a dual in-line package with 16 pins. As indicated in FIG. 2A, a suitable divider 52 is formed by connecting pins 11 and 8 to ground, pin 10 to the input, pin 12 to the output and pin 16 to the regulated power supply $V_R$.

The output from divider 52 is applied to the stabilizer 53, which is also formed by an integrated circuit, illustratively a monolithic T-T-L (transistor-transistor-logic) multivibrator. A representative integrated circuit $I_2$ for the stabilizer 53 bears the designation "SN74121" of Texas Instruments, Inc., Dallas, Texas, and is described in a publication "TTL Integrated Circuits Catalog from Texas Instruments," dated Aug. 1969.

Such an integrated circuit multivibrator $I_2$ operates by triggering from positive going inputs at a prescribed voltage level. Once triggered, its output is independent of further input transitions. It is contained in a dual in-line package with 14 pins. As indicated in FIG. 2A, pins 3, 4 and 7 are grounded, a timing capacitor $C_4$ is connected between pins 10 and 11, pins 9 and 14 are connected to the regulated power supply $V_R$, the input is supplied to pin 5 and the low-duty-cycle pulse train output S-2 appears at pin 6. The input to pin 5 is through an impedance match interface 42, which is identical with the unit 42 of the comparator 40 in FIG. 2B, described in detail below.

The output pulse train S-2 is applied directly to the frequency-phase comparator module 41 in the frequency and phase comparator 40 detailed in FIG. 2B. The module 41 is illustratively constituted by a monolithic T-T-L phase-frequency detector integrated circuit. A representative integrated circuit $I_3$ for the comparator 41 bears the designation "MC4044P" of Motorola Semiconductor Products, Inc., Phoenix, Arizona, and is described in a publication "MTTL Complex Functions Motorola," Oct. 1970.

The integrated circuit $I_3$ contains a phase-frequency detector for frequency discrimination and phase-locked-loop operation. The phase-frequency detector is "locked in" at a relatively high output level when the negative transitions of the motor signal and reference inputs are equal in both frequency and phase. If the motor signal input is lower in frequency, the output goes to a relatively low level, which is held until the frequencies of the reference and motor signals are equal. When the two frequencies are equal, but the motor signal lags the reference signal in phase, a series of pulses is produced by the negative transitions of the reference and indicator signals. As indicated in FIG. 2B, the output is on pin 13, pin 7 is grounded, pin 14 is connected to the regulated voltage supply $V_R$, pin 3 is connected to the motor signal generator 50 and pin 1 is connected to an impedance match interface 42. The latter permits a suitable signal transition between the integrated circuit $I_3$ of the module 41 and the reference signal generator 60.

The output of the signal generator 60 is obtained from a divider module 62, which is formed by a complementary symmetry metal-oxide-semiconductor integrated circuit $I_4$ of the same type and connection as the integrated circuit $I_1$ in the divider module 52 of FIG. 2A. Since there is a transition from complementary symmetry metal-oxide-semiconductor circuitry to transistor-transistor-logic circuitry, the impedance match interface 42 of FIG. 2B is employed, illustratively taking the form of a grounded emitter transistor $Q_6$ with associated resistors $R_9$ and $R_{10}$ and powered from the regulated voltage supply $V_R$.

The integrated module $I_4$ of the divider 62 provides a high degree of noise immunity and, by dividing the high frequency signal from the oscillator 61, produces an accurate reference signal which is within the proper operating range. For stability and low noise reasons the oscillator 61 also employs complementary symmetry metal-oxide-semiconductor integrated circuitry. A suitable device $I_5$ bears the RCA designation CD4007E" and appears in the RCA publication cited above. This device takes the form of a dual in-line package with 14 pins. It includes a dual complementary pair of devices and an inverter. Pin 7 is grounded, pin 14 is connected to the regulated voltage supply $V_R$, output pins 8 and 13 are connected directly to the divider module 62, while pin 6 is connected to the output pins 8 and 13 through a resistor $R_{11}$. Also connected between the jointly connected output pins 8 and 13 and pin 6 is a frequency determining circuit formed by a resistor $R_{12}$, a stable high-frequency crystal X, and capacitors $C_5$ through $C_7$, of which the intermediate capacitor $C_6$ is variable to permit minor adjustments in the frequency of the oscillator 61. It will be understood that in those situations where it is desired to have a variable frequency extending over a wide range, the reference signal generator 60 of FIGS. 1 and 2B is replaced by an appropriately configured variable frequency oscillator.

Once the reference signal T-3 of the reference signal generator 60 and the motor signal S-2 of the motor signal generator 50 (FIG. 2A) have been applied to the frequency-phase comparator module 41, there is a continuous output if the reference frequency exceeds the motor frequency, or there is a pulsating output if the frequencies are the same, but the motor signal lags in phase behind the reference signal. In order to act in the proper fashion upon the motor drive switch 32 (FIG. 2A) the amplifier and output switch 43 includes an inverter amplifier 43a and an output transistor $Q_7$ with a grounded emitter and a base that is biased from the regulated supply source $V_R$ through a biasing resistor $R_{13}$. A pulse train T-2 appears at the output through a load resistor $R_{14}$ when the frequencies of the reference and the motor signals are the same, but the phase of the motor signal lags behind the reference signal.

Figure 3:
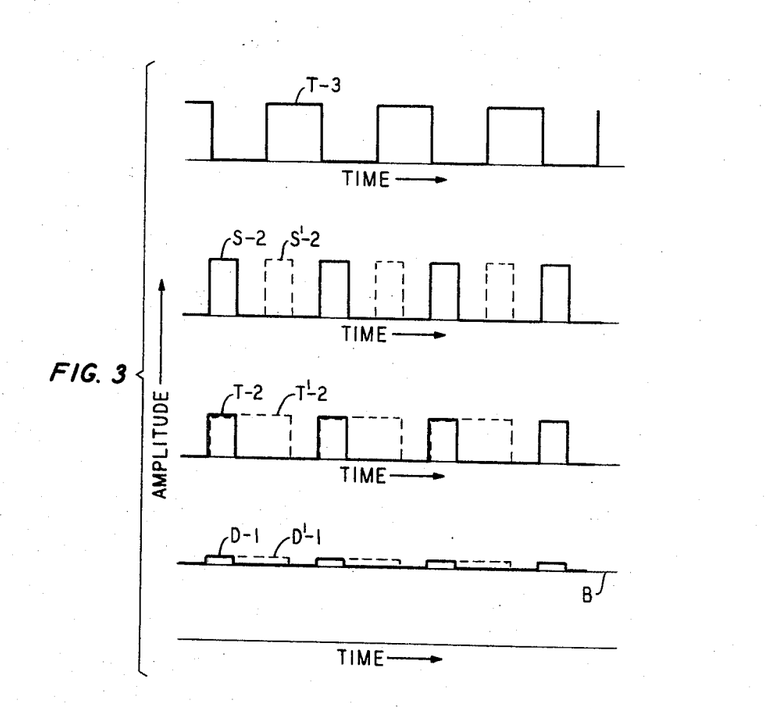
FIG. 3 is a set of graphs illustrating the operation of the speed regulation system of FIG. 1.

The operation of the motor speed regulation system of FIG. 1, when the reference and motor signals are in phase, but the motor 20 is subjected to an increasing load, is illustrated by the graphs of FIG. 3. The square wave T-3 of FIG. 3 is a diagram of the reference signal produced by the reference signal generator 60 of FIG. 1. Corresponding to the reference wave T-3 is the motor signal wave S-2, which illustratively has a phase lag of 90 degrees. Because of the stabilizer 53 in the motor signal generator 50 (FIG. 1), the duration of each pulse S-2 is illustratively slightly less than 50 per cent of that of the reference wave T-3. This corresponds to a duty cycle of just under 50 percent. Upon the occurrance of each negative-going edge of the reference wave T-3, the frequency and phase comparator 40 initiates an output of the pulse train T-2. Upon occurance of each negative-going edge of the wave S-2, the output is terminated, resulting in the pulse train T-2, which operates the motor drive switch 31. The resultant drive signal to the motor is given by the wave D-1 which has a bias voltage component B and a pulsating incremental wave T-1.

When the loading of the motor 20 increases, the pulse width of the motor indicator signal is unchanged but increasingly lags in phase. When the phase lag becomes 270 degrees, the motor indicator signals have the relative position of the dashed-line wave S'-2 of FIG. 3. The corresponding switching signal is given by the wave T'-2, with a corresponding motor drive wave D'-1, formed by a bias constituent B, and a pulsating incremental wave T'-1.

Figure 4A:
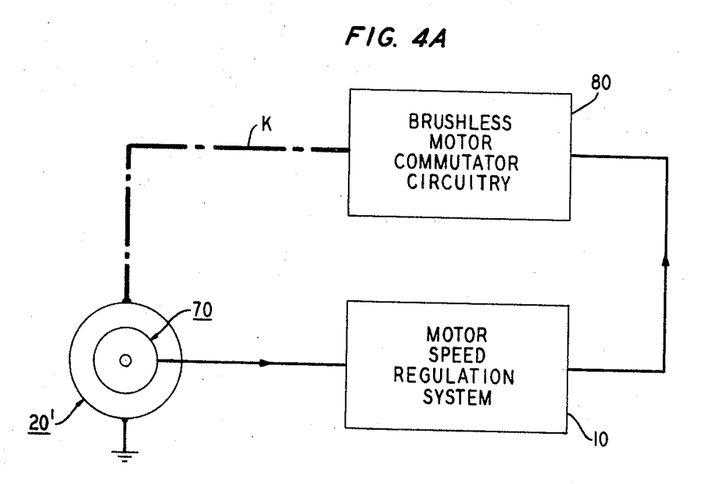
FIGS. 4A and 4B are diagrams of alternative circuitry for accomplishing speed regulation in accordance with the invention.

An adaptation of the motor speed regulation system 10 of FIG. 1 for a brushless D.C. motor 20' with magnetic sensing of rotor position using Hall generators is illustrated in FIG. 4A. The output of the system 10 (at the nodal point 34 of FIG. 2A) is connected to a brushless motor commutation circuit 80. Various leads from the commutator circuitry 80 extend to the brushless motor 20' over a cable K.

Figure 4B:
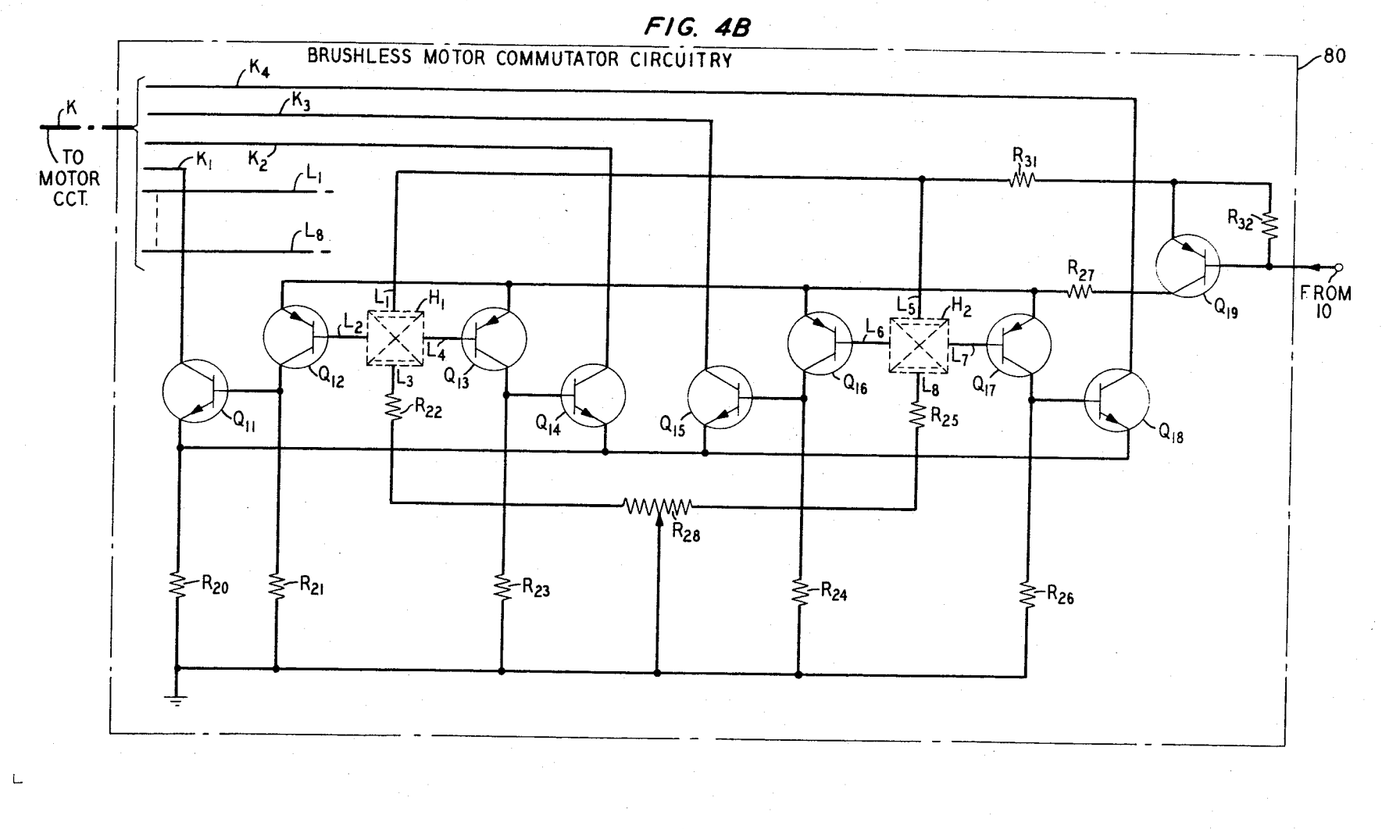

Details of the motor communication 80 of FIG. 4A are set forth in FIG. 4B. The brushless motor 20' of FIG. 4A has a permanent magnet rotor and two Hall-effect generators $H_1$ and $H_2$ (represented in dashed-line outline in FIG. 4B), each 90 degrees apart to sense the north and south pole positions of the rotor. It will be understood that the Hall generators $H_1$ and $H_2$ are within the motor 20' and are connected to the commutator circuitry over various leads $L_1$ through $L_8$ within the output cable K, but are shown within the circuitry of FIG. 4B for ease of understanding. The motor 20' also includes four stator coils which have connections $K_1$ through $K_4$ extending to commutation circuitry 80 of FIG. 4B, over the cable K and an additional terminal (not shown) to which a D.C. motor excitation voltage is applied.

For each coil there is a pair of transistors connected to one of the Hall generators. For example, the first Hall generator $H_1$ has a pair of transistors $Q_{11}$ and $Q_{12}$ for the first motor coil (connected to lead $K_1$) and a second pair of transistors $Q_{13}$ and $Q_{14}$ for the second motor coil (lead $K_2$). In operation, the Hall generators act like a commutator. For example, when the second Hall generator $H_2$ is in an appropriate position, it biases an associated transistor $Q_{17}$ "on" to provide a path for transistor $Q_{18}$ to apply an energizing signal to the lead $K_4$ for the fourth motor coil. Further rotation of the rotor affects subsequent coils in sequence. It is to be noted that transistors $Q_{11}$, $Q_{14}Q_{15}$ and $Q_{18}$ are of the n-p-n variety with their emitters connected to ground. If it is desired to employ p-n-p transistors, instead (with n-p-n used for transistors $Q_{12}$, $Q_{13}$, $Q_{16}$, $Q_{17}$ and $Q_{19}$) the motor excitation would be grounded and the excitation would be applied to the point that is shown grounded.

A suitable D.C. motor 20' for the circuitry of FIG. 4A is of the kind described in Bulletin 1AD/G of Siemens America, Incorporated, published Sept., 1969, for which a satisfactory excitation level is 24 volts (positive).

For the ordinary operation of a brushless D. C. motor with magnetic sensing of the rotor position by a Hall generator, the motor voltage for each motor winding is in the form of a sinusoid. When the motor speed control circuitry of FIG. 1 is employed in the manner indicated by FIG. 4A, the motor voltage for each motor winding has a base sinusoidal component of reduced amplitude which is supplemented by a incremental pulse in the form of a "chopped" sinusoid. The resultant excitation can be represented by the combination of a pure sinusoid of reduced amplitude with a pulsating signal having a sinusoidal envelope. This kind of motor control signal results in more efficient operation of the motor. It permits the use of smaller components because of reduced power dissipation and there is an attendant reduction in operation temperature and greater temperature stability.

It is to be noted that a brushless D.C. motor with magnetic sensing of rotor position using Hall generators is but one type of brushless motor. Other brushless motors, for example, those employing photo-optical sensing of rotor position are connected and operated in accordance with the invention in the fashion indicated by FIG. 1.

While various aspects of the invention have been set forth by the drawings and the specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. A system for regulating the speed of an electrical motor, which comprises
   means for generating a first, reference signal for representing a desired condition of the motor,
   means for generating a second, indicator signal for representing the actual condition of said motor,
   means for comparing the frequency and phase of said indicator signal with that of said reference signal, and
   means responsive to the comparing means for applying a direct drive signal or a pulsating drive signal to said motor according to whether the frequency of said reference signal exceeds or equals that of said indicator signal and generating said pulsating drive signal in an amplitude varying between the level of said direct drive signal and a lower, non-zero threshold level.

2. A system for regulating the speed of an electrical motor, which comprises
   means for generating a first, reference signal for representing a desired condition of the motor,
   means for generating a second, indicator signal for representing the actual condition of said motor,
   means for comparing said indicator signal with said reference signal, and
   means responsive to the comparing means for applying to said motor a pulsating drive signal varying in amplitude between upper and lower non-zero threshold levels when said motor operates under load and the frequency of said reference signal equals that of said indicator signal.

3. A motor speed regulation system as defined in claim 2 wherein the magnitude of the lower non-zero threshold level is less than that of the back electromotive force of said motor at the desired speed thereof.

4. A motor speed regulation system as defined in claim 2 wherein the means for generating said indicator signal includes a tachometer for generating a signal having a frequency in excess of the rotation rate of said motor and is mounted thereon.

5. A motor speed regulation system as defined in claim 4 wherein said tachometer includes a transparent disk mounted on a shaft of said motor and having equidistant segments thereon near the circumference thereof, a stationary, apertured masking disk aligned with the segment bearing disk and photosensitive means for generating said indicator signal as said segment bearing disk rotates relative to said apertured disk.

6. A motor speed regulation system as defined in claim 4 wherein said means for generating said indicator signal includes a divider for the tachometer signal, thereby to reduce the jitter effect thereof.

7. A motor speed regulation system as defined in claim 1 wherein the means for generating said reference signal comprises a variable frequency oscillator.

8. A motor speed regulation system as defined in claim 7 wherein said variable frequency oscillator includes a stable crystal-controlled oscillator having a frequency in excess of that of said motor.

9. A speed regulation system as defined in claim 7 further including means for dividing the output of said oscillator to produce a reference signal for comparison with said indicator signal.

10. A speed regulation system as defined in claim 2 wherein the constituents of said system are formed by complementary symmetry metal-oxide-semiconductor components for the means for generating said reference signal and by transistor-transistor-logic components for said comparing means.

11. A speed regulation system as defined in claim 2 wherein the means for generating said indicator signal includes means for reducing the duty cycle thereof.

12. A motor speed regulation system as defined in claim 2 wherein said comparing means generates an output train of pulses, each of a width proportional to the phase difference between said first and second signals.

* * * * *